United States Patent
Jacquel et al.

(10) Patent No.: US 12,037,453 B2
(45) Date of Patent: Jul. 16, 2024

(54) AROMATIC POLYETHERS CONTAINING A BIOSOURCED FURAN DIOL

(71) Applicants: ROQUETTE FRERES, Lestrem (FR); UNIVERSITE CLAUDE BERNARD LYON 1, Villeurbanne (FR); CENTRE NATIONAL DE LA RECHERCHE SCIENTIFIQUE, Paris (FR)

(72) Inventors: Nicolas Jacquel, Lambersart (FR); Sarah Degras, Villeurbanne (FR); Régis Mercier, Irigny (FR); Thierry Delaunay, Chenehutt (FR)

(73) Assignees: Roquette Freres, Lestrem (FR); Universite Claude Bernard Lyon 1, Villeurbanne (FR); Centre National de la Recherche Scientifique, Paris (FR)

( * ) Notice: Subject to any disclaimer, the term of this patent is extended or adjusted under 35 U.S.C. 154(b) by 737 days.

(21) Appl. No.: 17/269,637

(22) PCT Filed: Aug. 20, 2019

(86) PCT No.: PCT/FR2019/000138
§ 371 (c)(1),
(2) Date: Feb. 19, 2021

(87) PCT Pub. No.: WO2020/039128
PCT Pub. Date: Feb. 27, 2020

(65) Prior Publication Data
US 2021/0317265 A1    Oct. 14, 2021

(30) Foreign Application Priority Data
Aug. 20, 2018  (FR) ....................... 1857546

(51) Int. Cl.
C08G 65/40   (2006.01)
B01D 71/52   (2006.01)
C08G 75/20   (2016.01)
B01D 71/68   (2006.01)

(52) U.S. Cl.
CPC ....... C08G 65/4056 (2013.01); B01D 71/522 (2022.08); C08G 75/20 (2013.01); B01D 71/68 (2013.01); C08G 2650/48 (2013.01)

(58) Field of Classification Search
None
See application file for complete search history.

(56) References Cited

FOREIGN PATENT DOCUMENTS

EP    3170855 A1    5/2017

OTHER PUBLICATIONS

The English translation of the International Search Report, mailed on Nov. 27, 2019, in the corresponding PCT Appl. No. PCT/FR2019/000138.
Chatti et al. "Poly(ether sulfone) of Isosorbide, Isomannide and Isoidide," High Performance Polymers, Institute of Physics Publishing, Bristol, GB, vol. 21, No. 1, Feb. 1, 2009, pp. 105-118, XP008151327.
Belgacem et al. "Copolyethersulfones of 1,4:3,6-dianhydrohexitols and bisphenol A" Designed Monomers and Polymers, vol. 19, No. 3, Jan. 29, 2016, pp. 248-255, XP055585593.

*Primary Examiner* — Megan McCulley

(57) ABSTRACT

The present invention relates to a polymer of the aromatic polyether type, containing a biosourced furan diol, to a method for producing said polymer, and to the use of said polymer for producing membranes.

15 Claims, No Drawings

AROMATIC POLYETHERS CONTAINING A BIOSOURCED FURAN DIOL

CROSS-REFERENCE TO RELATED APPLICATIONS

This application is a National Stage Application of PCT/FR2019/000138 filed Aug. 20, 2019, which claims priority from French Patent Application No. 1857546, filed on Aug. 20, 2018. The priority of said PCT and French Patent Application are claimed. Each of the prior mentioned applications is hereby incorporated by reference herein in its entirety.

FIELD OF THE INVENTION

The present invention relates to a polymer of the aromatic polyether type based on a biosourced furan diol, to a process for preparing said polymer, and to the use of said polymer for producing membranes of manufactured parts and coatings.

PRIOR ART

The chemical industry, which remains mainly based on fossil resources, is entering a transition phase toward the use of more durable, biosourced raw materials. Increasing prices of fossil raw materials and rising environmental concerns, such as greenhouse gas emissions, have spurred academic and industrial research to explore the use of biomass for the durable production of fuels and of chemicals. The development of biosourced polymers and of other materials follows the same trend and represents an emerging and important field.

Aromatic polyethers, such as polyether sulfones, polyether ketones and polyether benzonitriles, are well known as high-performance polymers by virtue of their excellent thermal stabilities and mechanical properties. The main application of these polymers consists of liquid and gas phase separation membranes. The polyether sulfones available on the market are notably synthesized from aromatic diols such as bisphenol A or 4,4'-dihydroxyphenyl with dichlorodiphenyl sulfone. Thus, industry has started looking at the partial replacement of aromatic diols with a diol of biomass origin, such as isosorbide.

Thus, Kricheldorf et al. firstly described the preparation and characterization of polyether sulfones containing isosorbide, starting from silylated isosorbide and difluorodiphenyl sulfone (H. Kricheldorf et al., J. Polymer Sci., Part A: Polym. Chem., 1995, 33, 2667-2671). As silylated isosorbide is expensive, Kricheldorf and Chatti modified their polymerization conditions and described the synthesis of polyether sulfones containing isosorbide, starting from non-functionalized isosorbide and difluorodiphenyl sulfone (S. Chatti et al., High Perform. Polym., 2009, 21, 105-118).

Belgacem et al. then described the synthesis of polyether sulfones containing a 1,4:3,6-dianhydrohexitol and bisphenol A, starting from difluorodiphenyl sulfone, a 1,4:3,6-dianhydrohexitol and bisphenol A as monomers reacted together in the same reaction medium (Belgacem et al., Des. Monomers Polym., 2016, 19, 248-255). Under these conditions, the polymer obtained is a statistical copolymer in which the sequence of units containing 1,4:3,6-dianhydrohexitol and bisphenol A is random.

Patent application US 2017/0240708 also describes the synthesis of polyether sulfones containing a 1,4:3,6-dianhydrohexitol and bisphenol A via a similar process. The polyether sulfone obtained is a statistical copolymer based on bisphenol A and isosorbide. This same patent application also describes the synthesis of a polyether sulfone starting from cyclohexanedimethanol and isosorbide.

Moreover, Kanetaka et al. described the synthesis of polyether ketones starting from a 2,5-furandicarboxylic acid derivative (Kanetaka et al., J. Pol. Sci., 2016, 54, 3094-3101).

However, and in a general manner, those skilled in the art are still seeking to expand the library of polymers of the aromatic polyether type obtained from a biosourced diol, as part of an initiative aimed at saving fossil materials to the benefit of biosourced raw materials.

In particular, there is also a need to provide polymers of this type, which have features making them suitable for use in manufacturing membranes. These features are, for example, high number-average molecular masses (Mn) which are required for obtaining film-forming properties. These polymers may also, advantageously, be highly hydrophilic: in the case of a membrane, said membrane will thus get wet rapidly, which will result in rapid filtration with high flow rates and yields. Finally, these polymers may also demonstrate permeability properties, and notably selectivity properties toward certain gases and/or liquids, which may prove to be particularly advantageous in membrane filtration processes.

SUMMARY OF THE INVENTION

The invention relates to a polymer of the aromatic polyether type of formula (I) comprising a repeating unit formed from a biosourced furan diol and a dihalo aromatic compound X—Ar—X, and a second repeating unit formed from a co-diol HO-D-OH and a dihalo aromatic compound X—Ar—X:

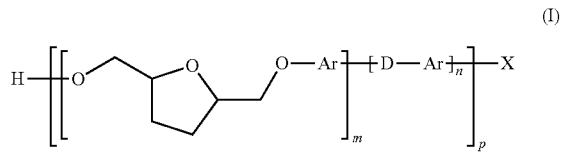

in which
 m is an integer greater than 1
 n is 0 or an integer greater than 1
 the ratio m/n is between 100/0 and 1/99
 p is an integer greater than 1
 Ar originates from the dihalo aromatic compound and is selected from the group consisting of:

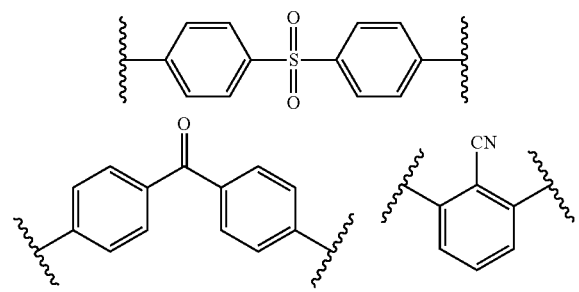

D originates from the co-diol and is selected from the group consisting of:

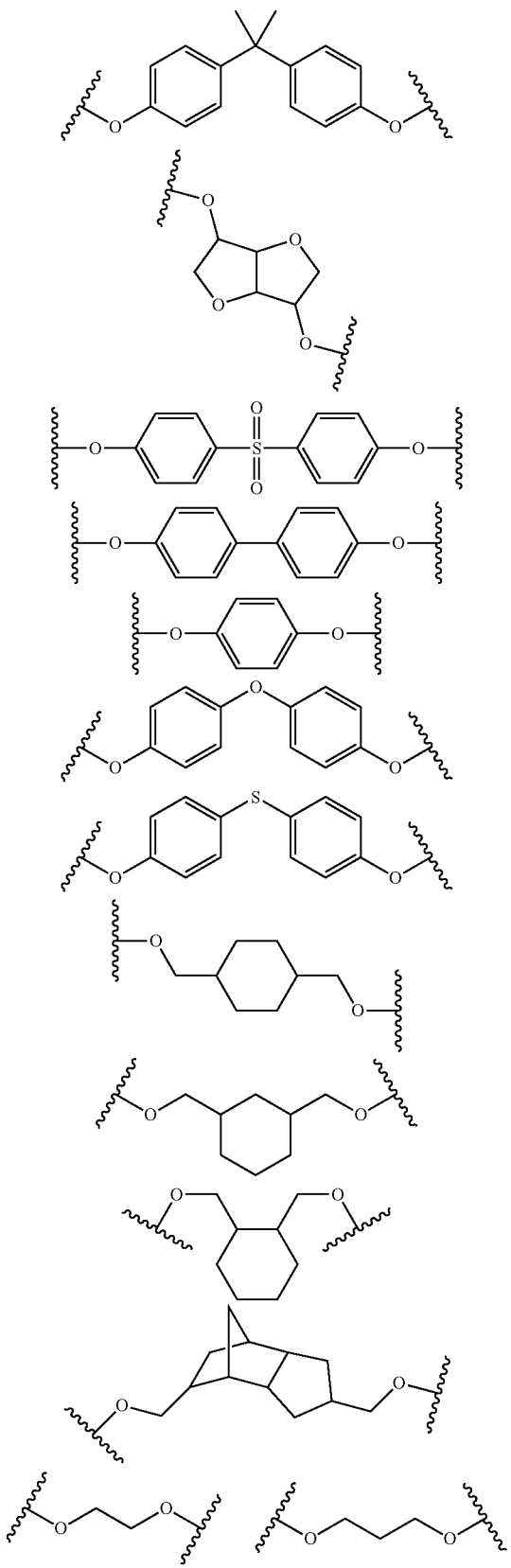

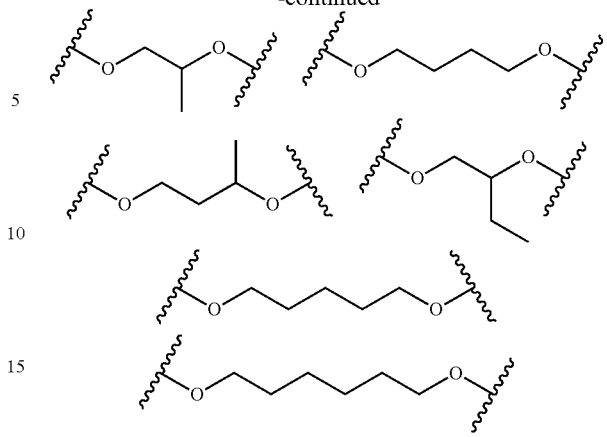

X is a halogen, preferably X is chosen from fluorine and chlorine, more preferably X is fluorine.

The invention also relates to a process for preparing the polymer of the aromatic polyether type comprising the repeating unit(s) of formula I, comprising a step of reacting tetrahydrofurandimethanol, optionally in the presence of a co-diol, with a dihalo aromatic compound in the presence of a base in an organic solvent.

Another subject of the present invention relates to use of the polymer according to the invention for producing membranes.

DETAILED DESCRIPTION

The invention relates to a polymer of the aromatic polyether type of formula (I) comprising a repeating unit formed from a biosourced furan diol and a dihalo aromatic compound X—Ar—X, and optionally a second repeating unit formed from a co-diol HO-D-OH and a dihalo aromatic compound X—Ar—X:

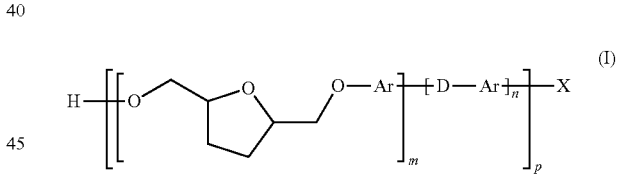

in which
m is an integer greater than 1
n is 0 or an integer greater than 1
the ratio m/n is between 100/0 and 1/99
p is an integer greater than 1
Ar is selected from the group consisting of:

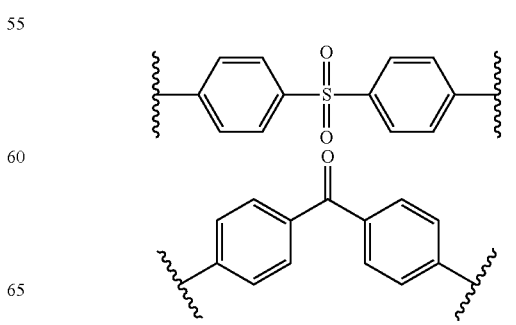

-continued

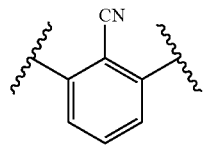

D is selected from the group consisting of:

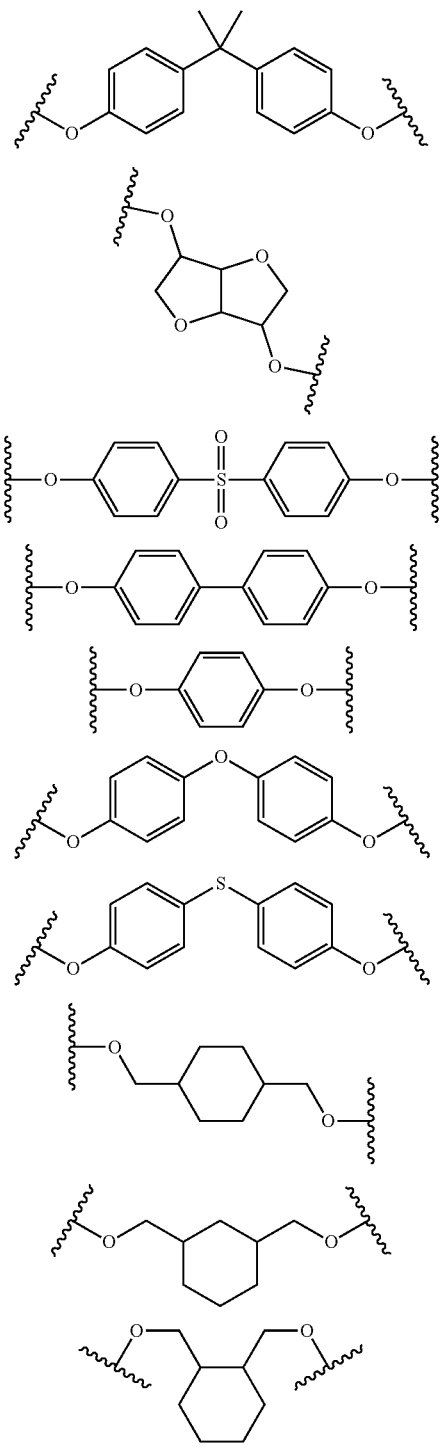

-continued

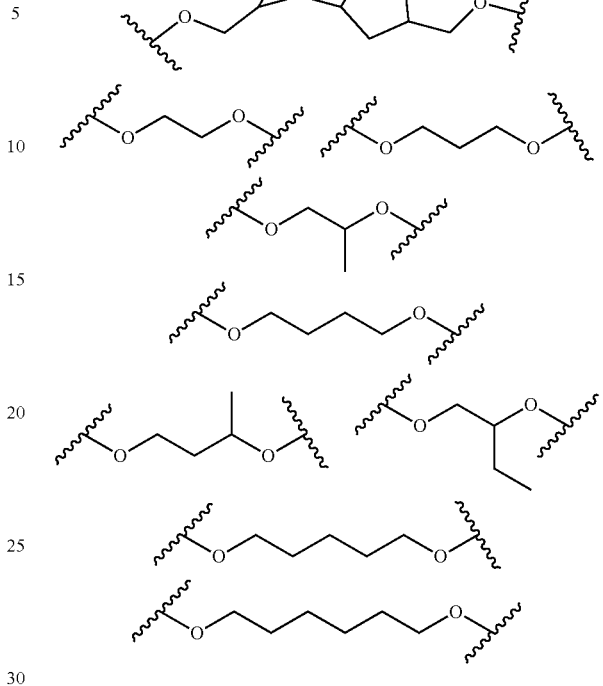

X is a halogen, preferably X is chosen from fluorine and chlorine, more preferably X is fluorine.

It is to the inventors' credit to have shown that the incorporation of tetrahydrofurandimethanol into the polymer chain can improve the hydrophilic nature of the polymer of the invention. This high hydrophilicity is a particularly advantageous property for producing filtration membranes: said membrane will get wet rapidly, which results in rapid filtration with high flow rates and yields. The presence of tetrahydrofurandimethanol in the polymer of the invention also makes it possible to obtain good permeability properties.

The polymer of formula I may also be in the form of a statistical copolymer or in the form of a homopolymer.

When the ratio m/n is between 99/1 and 1/99, the polymer according to the invention is in the form of a statistical copolymer. For the purposes of the present invention, the term "statistical copolymer" means a polymer originating from the copolymerization of at least two types of chemically different monomers, called "co-monomers". A statistical copolymer is thus formed from at least two repeating units linked together in a random manner.

When the ratio m/n is 100/0, the polymer according to the invention is in the form of a homopolymer. For the purposes of the present invention, the term "homopolymer" means a polymer originating from only one monomer species. All the repeating units of a homopolymer thus share the same chemical nature.

In a general manner, the mean molecular mass of the polymer of formula (I) is between 1000 and 150 000 g/mol.

A particular class of polymers forming a subject of the present patent application consists of the polymers of formula (I) as defined above, the mean molecular mass of which is between 40 000 and 150 000 g/mol, preferably between 70 000 and 150 000 g/mol.

Preferred polymers according to the invention are polymers of formula (I) below

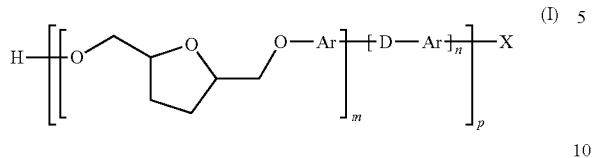

in which
- m is an integer greater than 1
- n is 0 or an integer greater than 1
- the ratio m/n is between 100/0 and 1/99, preferably between 100/0 and 10/90
- p is an integer greater than 1
- Ar is selected from the group consisting of:

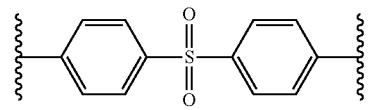

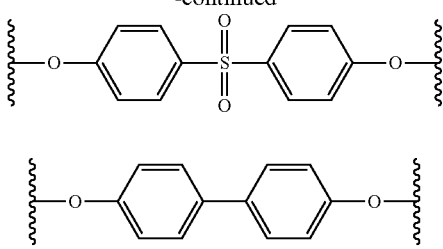

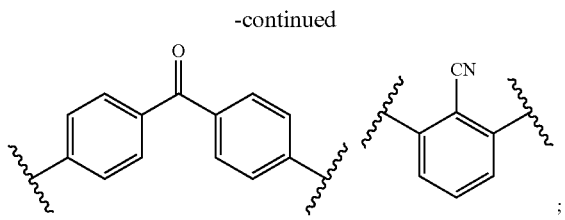

D is selected from the group consisting of:

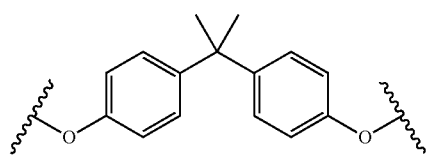

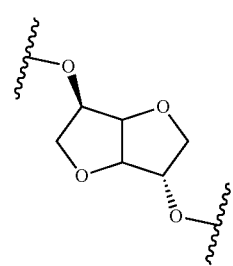

X is a halogen, preferably X is chosen from fluorine and chlorine, more preferably X is fluorine.

In a more preferred embodiment, the unit Ar is as follows:

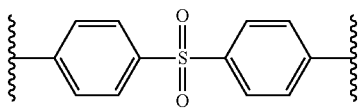 [SMILES: *c1ccc(S(=O)(=O)c2ccc(*)cc2)cc1]

According to this embodiment, the polymer of the invention is a polymer comprising the repeating units of formula (II) below:

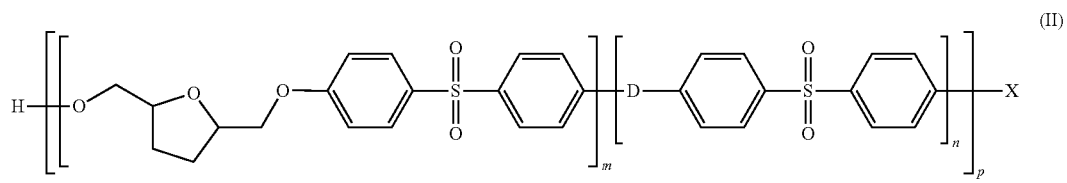

in which
- m is an integer greater than 1
- n is 0 or an integer greater than 1
- the ratio m/n is between 100/0 and 1/99, preferably between 100/0 and 10/90
- p is an integer greater than 1
- D is selected from the group consisting of:

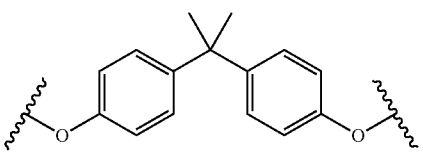 [SMILES: *Oc1ccc(C(C)(C)c2ccc(O*)cc2)cc1]

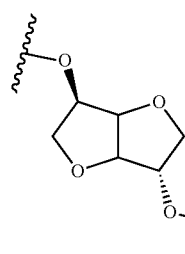

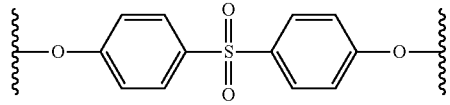

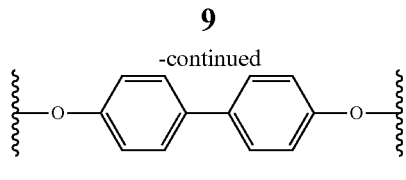

X is a halogen, preferably X is chosen from fluorine and chlorine, more preferably X is fluorine.

In another more preferred embodiment, the unit D is as follows:

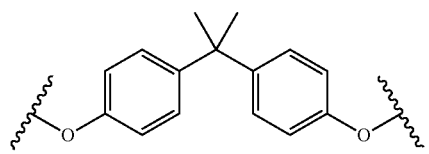

According to this embodiment, the polymer according to the invention is a polymer comprising the repeating units of formula (III) below:

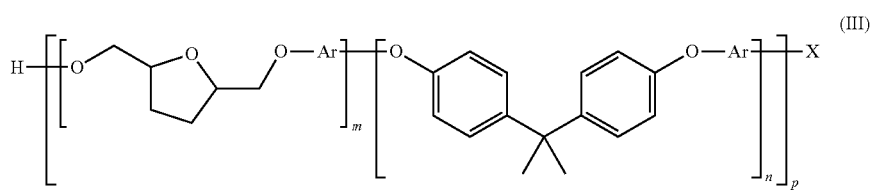

in which
- m is an integer greater than 1
- n is 0 or an integer greater than 1
- the ratio m/n is between 100/0 and 1/99, preferably between 100/0 and 10/90
- p is an integer greater than 1
- Ar is selected from the group consisting of:

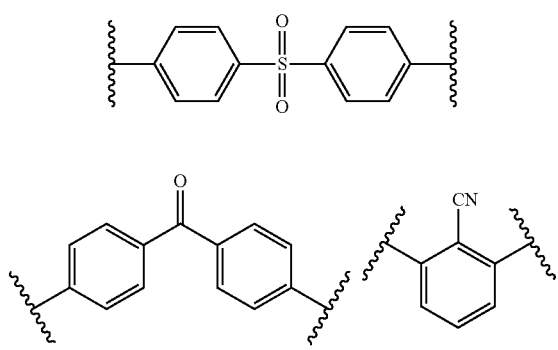

X is a halogen, preferably X is chosen from fluorine and chlorine, more preferably X is fluorine.

In a particular embodiment, the ratio m/n of the polymer of formula (I) is 100/0. The polymer of the invention is then in the form of a homopolymer comprising the repeating unit of formula (IV) below:

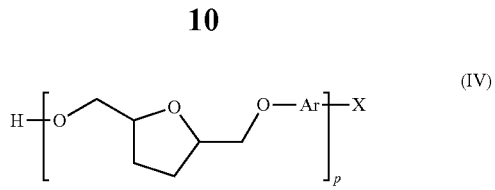

in which
- p is an integer greater than 1
- Ar is selected from the group consisting of:

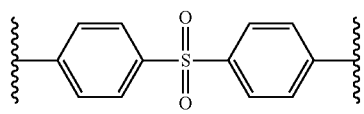

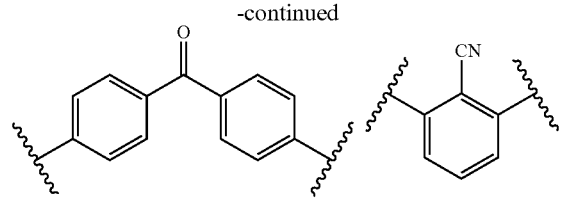

X is a halogen, preferably X is chosen from fluorine and chlorine, more preferably X is fluorine.

According to this last embodiment in which the ratio m/n is equal to 100/0, a particularly preferred polymer is a polymer of formula (V) below:

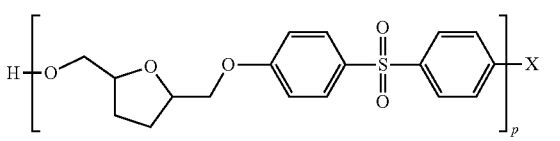

in which
- p is an integer greater than 1
- X is a halogen, preferably X is chosen from fluorine and chlorine, more preferably X is fluorine.

The invention also relates to a process for preparing the polymer of the aromatic polyether type comprising the repeating unit(s) of formula (I).

The process for preparing the polymer comprising the repeating unit(s) of formula (I) comprises a step of reacting tetrahydrofurandimethanol, optionally in the presence of a co-diol HO-D-OH, with a dihalo aromatic compound X—Ar—X in the presence of a base in an organic solvent. The co-diols and the dihalo aromatic compounds that may be used are those described above.

Advantageously, the process of the invention makes it possible to control the mole ratio between the tetrahydrofurandimethanol and the dihalo aromatic compound, so as to obtain polymers having high hydrophilicity and/or good permeability properties.

This high hydrophilicity is a particularly advantageous property for producing filtration membranes: said membrane will get wet rapidly, which results in rapid filtration with high flow rates and yields.

Thus, the process that is the subject of the present patent application is a process for preparing a polymer comprising the repeating unit(s) of formula (I),

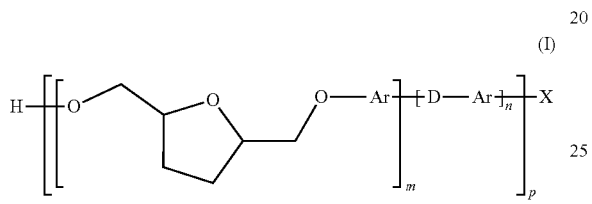

in which
the ratio m/n is between 100/0 and 1/99
p is an integer greater than 1
Ar is selected from the group consisting of:

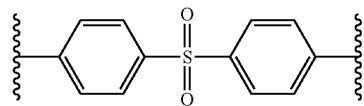

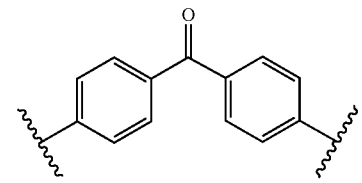

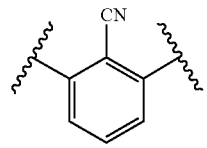

D is selected from the group consisting of:

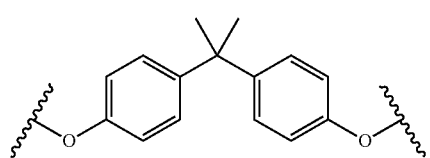

-continued

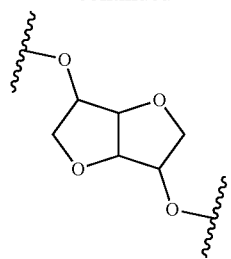

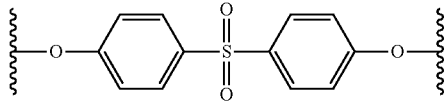

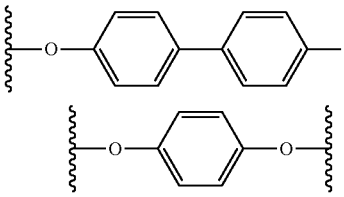

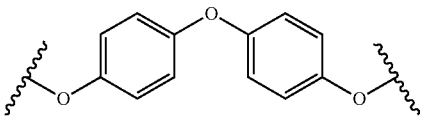

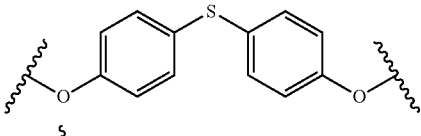

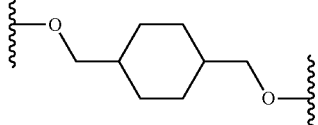

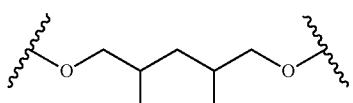

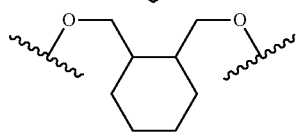

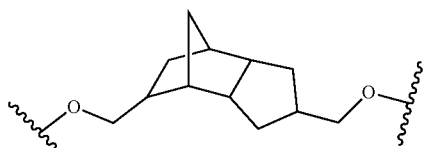

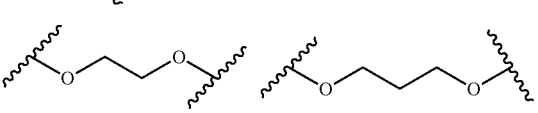

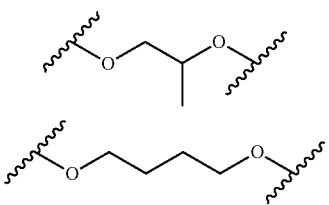

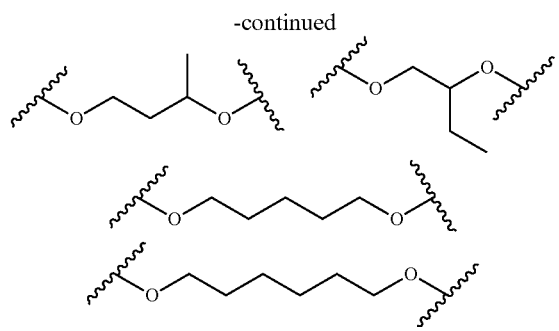

X is a halogen, preferably X is chosen from fluorine and chlorine, more preferably X is fluorine, and comprises a step of reacting tetrahydrofurandimethanol, optionally in the presence of a compound of formula OH-D-OH, with a dihalo aromatic compound of formula X—Ar—X, in the presence of a base in an organic solvent.

In a general manner, the mean molecular mass of the polymer of formula (I) is between 1000 and 150 000 g/mol.

A particular class of polymers forming a subject of the present patent application consists of polymers of the above-mentioned formula (I), the mean molecular mass of which is between 40 000 and 150 000 g/mol, preferably between 70 000 and 150 000 g/mol.

Variants of the process according to the invention are variants which result in polymers of formulae (II), (III), (IV) and (V), by implementing the choices concerning the compounds X—Ar—X and HO-D-OH, the ratio m/n and the integer p, explained hereinabove, relating to said polymers of formulae (II), (III), (IV) and (V). These choices thus apply mutatis mutandis to the various variants of the process according to the invention.

The reaction between the tetrahydrofurandimethanol, and optionally a co-diol, with the dihalo aromatic compound is performed in the presence of a base in an organic solvent and makes it possible to form the polymer of the invention.

The base is advantageously chosen from alkali metal salts. Preferably, the base is chosen from potassium carbonate ($K_2CO_3$), sodium carbonate ($Na_2CO_3$), cesium carbonate ($CsCO_3$), lithium carbonate ($LiCO_3$), potassium methoxide, sodium methoxide, potassium ethoxide, potassium tert-butoxide, potassium tert-pentoxide, potassium bis(trimethyl) silanolate, potassium bis(trimethylsilyl)amide, potassium hydroxide, sodium hydroxide, and sodium hydride. More preferably, the base is chosen from potassium carbonate and sodium carbonate. Even more preferentially, the base is potassium carbonate and sodium carbonate.

Advantageously, the base proportion is between 1 and 3 molar equivalents relative to the total amount of tetrahydrofurandimethanol and of co-diol. Preferably, the base proportion is about 2 molar equivalents relative to the total amount of tetrahydrofurandimethanol and of co-diol.

The organic solvent is advantageously chosen from polar aprotic solvents. For the purposes of the present invention, the term "polar aprotic solvent" means a solvent having a dipolar moment without any acidic hydrogen atoms, i.e. bonded to a heteroatom. Preferably, the solvent is chosen from polar aprotic solvents comprising a sulfur atom or a nitrogen atom. More preferably, the solvent is chosen from dimethyl sulfoxide, diethyl sulfoxide, sulfolane, dimethyl sulfone, diethyl sulfone, diphenyl sulfone, diisopropyl sulfone, tetrahydrothiophene 1-monoxide, dimethylacetamide, dimethylformamide, N-methyl-2-pyrrolidone, and N-cyclohexyl-2-pyrrolidone, alone or as a mixture. More preferentially, the solvent is chosen from N-methyl-2-pyrrolidone and dimethyl sulfoxide, alone or as a mixture. Even more preferentially, the solvent is dimethyl sulfoxide or N-methyl-2-pyrrolidone.

In one embodiment, a co-solvent may be added to the organic solvent. The co-solvent is advantageously chosen from toluene, benzene, chlorobenzene and tetrahydrofuran, alone or as a mixture. Preferably, the co-solvent is toluene.

Thus, the polymer is formed by reaction between the tetrahydrofurandimethanol, optionally a co-diol, and the dihalo aromatic compound, as monomers. Advantageously, the total proportion of monomers, i.e. the sum of the amount of tetrahydrofurandimethanol, of co-diol and of dihalo aromatic compound, is between 10% and 50%, preferably between 20% and 40% by mass relative to the sum of the mass of solvent and of the mass of monomers. More preferably, the proportion of monomers is about 30% by mass relative to the sum of the mass of solvent and of the mass of monomers.

In order to start the reaction between the tetrahydrofurandimethanol, optionally a co-diol and the dihalo aromatic compound to form the polymer, the reaction medium comprising the tetrahydrofurandimethanol, optionally a co-diol, and the dihalo aromatic compound, is heated. Advantageously, the preparation of the polymer is performed at a temperature of between 160° C. and 240° C., preferably between 190° C. and 230° C., more preferably between 200° C. and 220° C., for a time of between 30 minutes and 12 hours, preferably between 30 minutes and 6 hours, more preferably between 1 hour and 3 hours. Even more preferentially, the polymer is prepared at a temperature of about 210° C., for a time of about 2 hours.

On conclusion of the reaction, the polymer obtained may be precipitated via techniques known to those skilled in the art, for instance precipitation of the reaction medium in a large volume of water, of about 10 times the volume of the reaction medium. The polymer may then be dried using techniques known to those skilled in the art, for instance in an oven at 80° C. for 12 hours. Finally, the resulting polymer may optionally undergo post-treatment steps, notably for increasing its purity or improving some of its properties.

Another subject of the present invention relates to the use of the polymer according to the invention for producing membranes, manufactured parts and coatings.

Membranes may be manufactured from the polymer according to the invention according to techniques known to those skilled in the art.

In particular, the membranes obtained using the polymer according to the invention have advantageous hydrophilicity and gas permeability properties. The membranes may be in the form of porous or nonporous films. The membranes may be manufactured in the form of monofilaments or hollow fibers. The polymer according to the invention may be used in aqueous media, including bodily fluids. The polymer according to the invention is biocompatible and may thus be used as a membrane in the medical field, such as for hemodialysis, or in the consumption (food and drinks) industry, and in the wastewater treatment industry. The porous membranes in the form of tubes or of hollow fibers may have various pore sizes, known those skilled in the art, depending on their applications (microfiltration, ultrafiltration, nanofiltration, reverse osmosis). The performance of aqueous membranes obtained using the polymer according to the invention may be improved via techniques known to those skilled in the art, in particular the use of sulfone monomers or the post-treatment of the membranes by sulfonation or by surface treatment to avoid fouling.

The gas-phase membranes may be used for producing nitrogen through separation of the nitrogen/oxygen mixture of air, and for producing methane through separation of methane and $CO_2$.

Membranes in the form of films or plates may be used for optics or for packaging purposes.

Molded parts may be manufactured using the polymer of the invention, according to techniques known to those skilled in the art. Injection molding of the polymer according to the invention may be used for the production of parts employed in the health industry, such as dental applications for replacing metals, glass and other disposable or reusable utensils, but also in the industries of aeronautics, electronics and motor vehicles.

Another subject of the present invention is the use of the polymer of the invention as a resin for coating metals in order to prevent corrosion.

The coating obtained from the polymer according to the invention may be applied on steel, aluminum, copper, metals used in the consumption (food and drink) industry, the naval industry such as ship hulls, the aerospace, motor vehicle, electricals, such as cabling, and electronics, such as circuits, industries. The resin obtained from the polymer according to the invention may also be applied to other substrates such as glass or carbon fiber, for the formation of a composite after evaporation of the solvent from the resin. The composites formed using the polymer resin according to the invention may be used in the aerospace and motor vehicle fields for replacing metal parts.

The invention will be understood more clearly on reading the examples that follow, which are intended to be purely illustrative and do not in any way limit the scope of the protection.

EXAMPLES

Example 1. General Procedure for Preparing a Copolymer According to the Invention Tetrahydrofurandimethanol and optionally a co-diol (5 mmol in total), the dihalo aromatic compound (5 mmol) and potassium carbonate (1.3961 g, 10 mmol) are introduced into a 100 mL three-necked round-bottomed flask equipped with a stirring paddle, and a nitrogen inlet and outlet for preventing oxidation. The whole mixture is dissolved in DMSO (5 mL) and is heated to 210° C. with stirring at 50 rpm. After heating for 2 to 9 hours at 210° C., the medium is diluted with 10 mL of DMSO. When the medium has returned to room temperature, the polymer is precipitated from 100 mL of distilled water in a beaker with magnetic stirring. After stirring for 1 hour, the polymer is collected by Buchner filtration and then dried in an oven for 12 hours at 80° C. The polymer is analyzed by SEC, $^1$H NMR and DSC.

Nuclear Magnetic Resonance (NMR)

The 100 MHz $^{13}$C spectra were recorded using a Brüker Ascend™ 400 machine in a 5-mm glass tube in DMSO-$d_6$.

Differential Scanning Calorimetry (DSC)

Differential scanning calorimetry analysis was performed using a DSC-Q5000 SA machine, TA Instruments, USA, with a nitrogen flow rate of 50 ml/min at 10° C./min or 20° C./min from 20° C. to 300° C., in a perforated aluminum crucible.

Size Exclusion Chromatography (SEC)

Molar mass analysis was performed by size exclusion chromatography using an Agilent PLgel 5 μm column in DMF/LiBr at 50° C. for 35 min, with a flow rate of 0.5 mL/min and PS calibration.

Polymer 1. THFDM/co-diol=100/0

Polymer 1 is prepared according to the above general procedure from tetrahydrofurandimethanol (5 mmol) and difluorodiphenyl sulfone (5 mmol) as the dihalo aromatic compound.

Polymer 2. THFDM/co-diol=100/0

Polymer 2 is prepared according to the above general procedure from tetrahydrofurandimethanol (5 mmol) and dichlorodiphenyl sulfone (5 mmol) as the dihalo aromatic compound.

Polymer 3. THFDM/co-diol=100/0

Polymer 3 is prepared according to the above general procedure from tetrahydrofurandimethanol (5 mmol) and difluorobenzonitrile (5 mmol) as the dihalo aromatic compound.

Polymer 4. THFDM/co-diol=100/0

Polymer 4 is prepared according to the above general procedure from tetrahydrofurandimethanol (5 mmol) and difluorobenzophenone (5 mmol) as the dihalo aromatic compound.

Polymer 5. THFDM/BPA=20/80

Polymer 5 is prepared according to the above general procedure from tetrahydrofurandimethanol (1 mmol), bisphenol A (4 mmol) as the co-diol and difluorodiphenyl sulfone (5 mmol) as the dihalo aromatic compound.

Polymer 6. THFDM/BPA=25/75

Polymer 6 is prepared according to the above general procedure from tetrahydrofurandimethanol (1.25 mmol), bisphenol A (3.75 mmol) as the co-diol and difluorodiphenyl sulfone (5 mmol) as the dihalo aromatic compound.

Polymer 7. THFDM/BPA=40/60

Polymer 7 is prepared according to the above general procedure from tetrahydrofurandimethanol (2 mmol), bisphenol A (3 mmol) as the co-diol and difluorodiphenyl sulfone (5 mmol) as the dihalo aromatic compound.

Polymer 8. THFDM/BPA=50/50

Polymer 8 is prepared according to the above general procedure from tetrahydrofurandimethanol (2.5 mmol), bisphenol A (2.5 mmol) as the co-diol and difluorodiphenyl sulfone (5 mmol) as the dihalo aromatic compound.

Polymer 9. THFDM/BPA=60/40

Polymer 9 is prepared according to the above general procedure from tetrahydrofurandimethanol (3 mmol), bisphenol A (2 mmol) as the co-diol and difluorodiphenyl sulfone (5 mmol) as the dihalo aromatic compound.

Polymer 10. THFDM/BPA=80/20

Polymer 10 is prepared according to the above general procedure from tetrahydrofurandimethanol (4 mmol), bisphenol A (1 mmol) as the co-diol and difluorodiphenyl sulfone (5 mmol) as the dihalo aromatic compound.

Polymer 11. THFDM/BB=50/50

Polymer 11 is prepared according to the above general procedure from tetrahydrofurandimethanol (2.5 mmol), 4,4'-dihydroxybiphenyl (2.5 mmol) as the co-diol and difluorodiphenyl sulfone (5 mmol) as the dihalo aromatic compound.

Polymer 12. THFDM/Bis S=50/50

Polymer 12 is prepared according to the above general procedure from tetrahydrofurandimethanol (2.5 mmol), bisphenol S (2.5 mmol) as the co-diol and difluorodiphenyl sulfone (5 mmol) as the dihalo aromatic compound.

Polymer 13. THFDM/IS=50/50

Polymer 13 is prepared according to the above general procedure from tetrahydrofurandimethanol (2.5 mmol), isosorbide (2.5 mmol) as the co-diol and difluorodiphenyl sulfone (5 mmol) as the dihalo aromatic compound.

The characterization of polymers 1 to 13 according to the invention is presented in Table 1.

Polymer 14 is a polyether sulfone purchased from ACROS ORGANICS 178910050 in the form of transparent granules. This product is a polyether sulfone based on bisphenol A and a diphenyl sulfone derivative.

TABLE 1

| Polymer | Dihalo compound | THFDM/ Co-diol Ratio | Reaction time (h) | Mn (g/mol) | Tg (° C.) |
|---|---|---|---|---|---|
| 1 | Difluorodiphenyl sulfone | 100/0 | 2 | 80 000 | 145 |
| 2 | Dichlorodiphenyl sulfone | 100/0 | 8 | 10 000 | 129 |
| 3 | Difluorobenzonitrile | 100/0 | 9 | 12 000 | 126 |
| 4 | Difluorobenzophenone | 100/0 | 9 | 13 500 | 103 |
| 5 | Difluorodiphenyl sulfone | 20/80 | 3 | 31 000 | 184 |
| 6 | Difluorodiphenyl sulfone | 25/75 | 7 | 36 000 | 178 |
| 7 | Difluorodiphenyl sulfone | 40/60 | 3 | 22 000 | 167 |
| 8 | Difluorodiphenyl sulfone | 50/50 | 8 | 45 000 | 154 |
| 9 | Difluorodiphenyl sulfone | 60/40 | 3 | 26 000 | 160 |
| 10 | Difluorodiphenyl sulfone | 80/20 | 3 | 21 900 | 145 |
| 11 | Difluorodiphenyl sulfone | 50/50 | 3 | 32 000 | 177 |
| 12 | Difluorodiphenyl sulfone | 50/50 | 3 | 26 900 | 181 |
| 13 | Difluorodiphenyl sulfone | 50/50 | 3 | 22 600 | 168 |
| 14 | — | — | — | 90 000 | 190 |

This table illustrates the features of the implemented process, and some of the physicochemical features of the resulting polymers. It clearly demonstrates the possibility for advantageously obtaining aromatic polyethers from a biosourced compound.

Example 2. General Procedure for Preparing Membranes from Polymers According to the Invention and Comparison with a Membrane Obtained from a Commercial Polymer A membrane is prepared from a 20 mol % solution in NMP of the polymer, cast on a glass plate. The solvent is then evaporated off using the following thermal cycle: 50° C. for 12 hours, 80° C. for 1 hour, 120° C. for 1 hour, 150° C. for 1 hour and 200° C. for 2 hours. A membrane is obtained after baking.

Membranes were prepared according to the above general procedure starting from polymers 1, 6 and 8 according to the invention, in comparison with a membrane prepared from a commercial polymer.

The characterizations applied to the membranes are described below:

Contact Angle

The contact angle of membranes prepared from polymers 1 and 8 according to the invention was measured with water and diiodomethane according to the model of Owens, Wendt, Rabel and Kaelble.

Dynamic Sorption

The water re-uptake was measured using Dynamic Vapor Sorption apparatus (DVS Q-5000 SA, TA Instruments) at atmospheric pressure and a 21° C. isotherm with a sorption/desorption cycle of from 0 to 90% humidity.

The results are presented in Table 2.

TABLE 2

| | Surface energy | | | Contact angle | | Sorption |
|---|---|---|---|---|---|---|
| Polymer | Energy (mN/m) | Polar part (mN/m) | Dispersed part (mN/m) | Water (°) | Diiodo-methane (°) | at 50% (g water/g sample) |
| 1 | 49.7 | 29.9 | 19.9 | 55.8 | 57.8 | 1.37% |
| 8 | 43.5 | 34.9 | 8.6 | 70.9 | 49.2 | 0.88% |
| 6 | 51.5 | 38.5 | 13.0 | 59.8 | 41.9 | 0.91% |
| Reference | 44.6 | 43.9 | 0.7 | 89.2 | 32.3 | 0.39% |

These results show that the hydrophilicity of the polymers according to the invention increases with the level of incorporation of tetrahydrofurandimethanol. Specifically, measurement of the contact angles of membranes prepared from polymers 1 and 8 provides evidence of the wettability of films containing THFDM, relative to the PES reference. The increase in surface energy as a function of the incorporation of tetrahydrofurandimethanol makes it possible to create stronger interactions of the polymer film with the drop of water. This in turn leads to a decrease in the contact angle of water as a function of the level of incorporation of tetrahydrofurandimethanol. Finally, and in a particularly advantageous manner, the polymers according to the invention have a water absorption capacity which is far greater than that of the reference: this much more pronounced hydrophilicity is particularly advantageous for a membrane, as the capacity thereof for rapid hydration influences its yield and efficiency.

Permeability

The experiments are performed at room temperature. The test consists in inserting the film to be studied into the permeation cell. After secondary vacuum desorption for 16 hours, the permeation experiment consists in applying a pressure (3 bar) of a chosen gas in the compartment upstream from the cell, and in measuring the pressure rise in the compartment downstream from the cell. The permeability is calculated from the slope of the pressure versus time straight line in the stationary regimen, if necessary, after correction for static vacuum. The gas permeation properties of the membranes prepared from polymer 6 according to the invention were measured. The results are presented in Table 3.

TABLE 3

| | P(He) | P($CO_2$) | P($O_2$) | He/$CO_2$ Selectivity | $CO_2$/$O_2$ Selectivity |
|---|---|---|---|---|---|
| Polymer 6 | 9.2 | 3.9 | 0.62 | 2.36 | 6.29 |
| Reference | 12.4 | 6.1 | 2.65 | 2.03 | 2.30 |

These results show that the membrane prepared from polymer 6, containing only 25 mol % of THFDM, has a selectivity for carbon dioxide relative to oxygen (6.29) greater than that of the reference membrane obtained using a commercial PES (2.3).

The invention claimed is:

1. An aromatic polyether of formula I, comprising a repeating unit formed from a biosourced furan diol and an aromatic compound X—Ar—X, and optionally a second repeating unit formed from a co-diol HO-D-OH and an aromatic compound X—Ar—X:

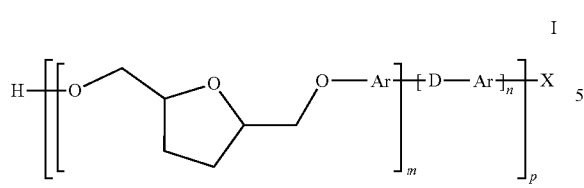

in which
Ar is selected from the group consisting of;

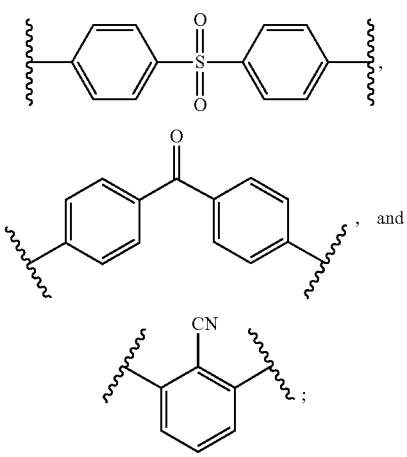

D is selected from the group consisting of:

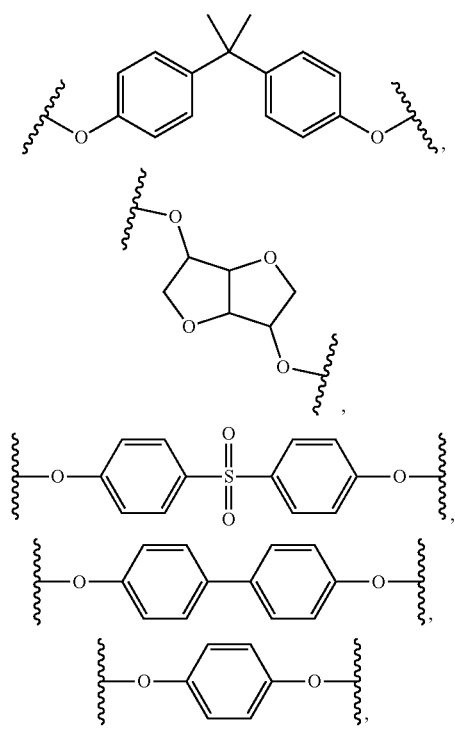

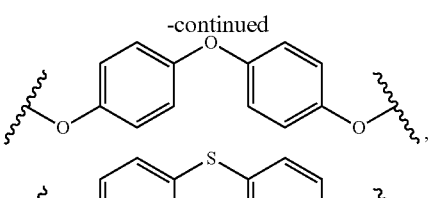

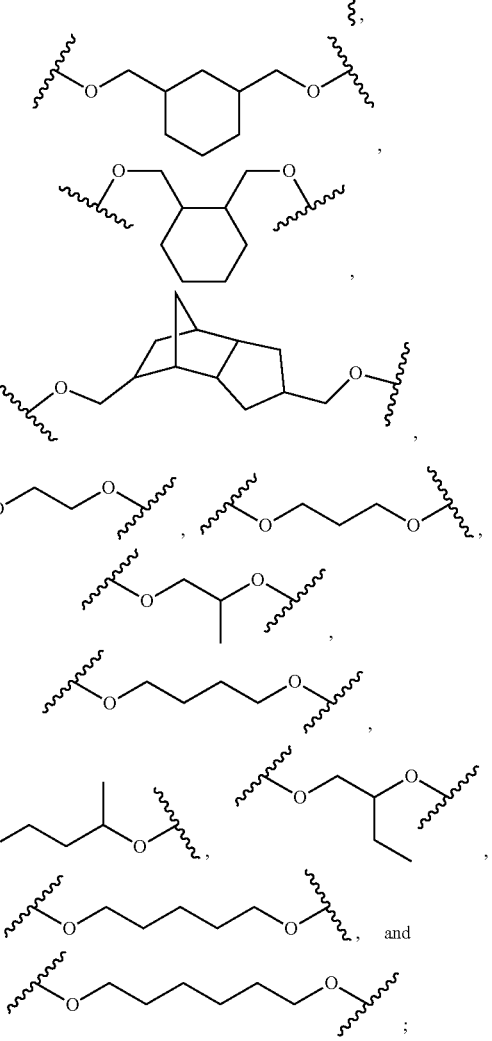

X is a halogen
m is an integer greater than 1
n is 0 or an integer greater than 1
the ratio m/n is between 100/0 and 1/99
p is an integer greater than 1.

2. The polymer as claimed in claim 1, wherein the mean molecular mass thereof is between 1000 and 150 000 g/mol.

3. The polymer as claimed in claim 2, wherein the mean molecular mass thereof is between 40 000 and 150 000 g/mol.

4. The polymer of formula (I) as claimed in claim 1

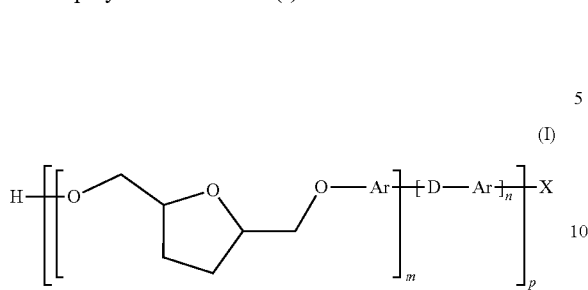
(I)

in which
the ratio m/n is between 100/0 and 1/99
p is an integer greater than 1
Ar is selected from the group consisting of:

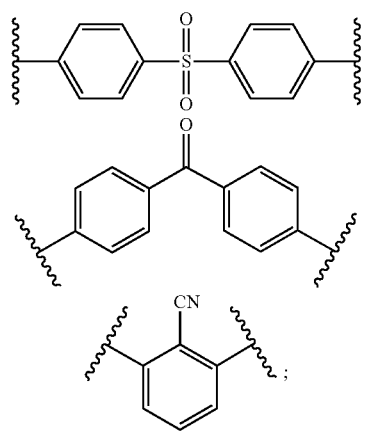

D is selected from the group consisting of:

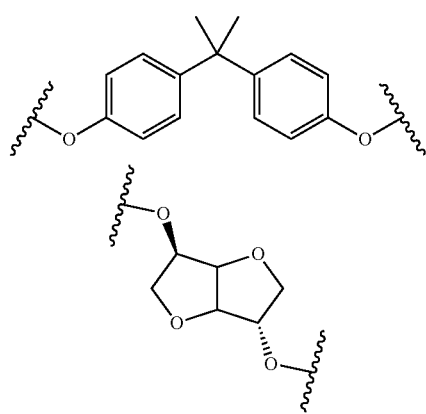

-continued

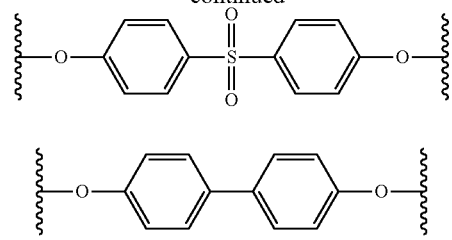

X is a halogen.

5. The polymer as claimed in claim 1 which has the structure of formula (II):

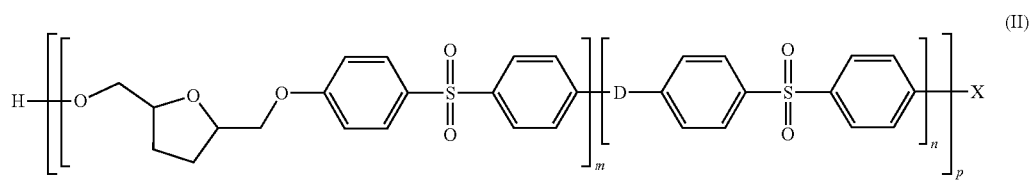
(II)

in which
the ratio m/n is between 100/0 and 1/99
p is an integer greater than 1
D is selected from the group consisting of:

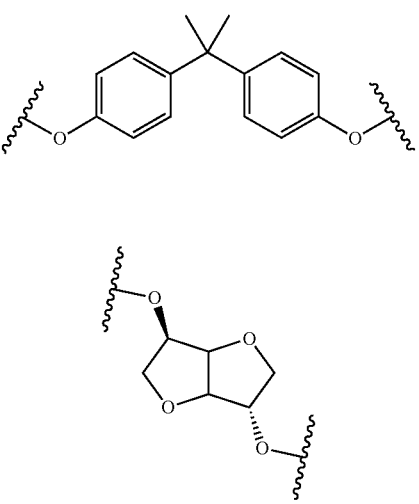

X is a halogen.

6. The polymer as claimed in claim 1 which has the structure of formula (III):

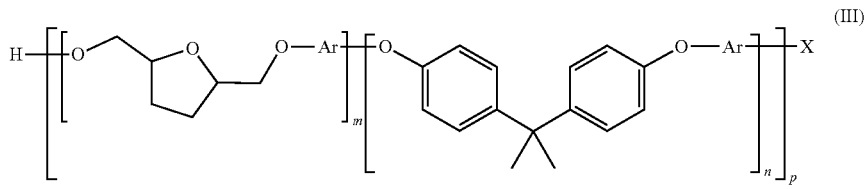

in which
m is an integer greater than 1
n is 0 or an integer greater than 1
the ratio m/n is between 100/0 and 1/99
p is an integer greater than 1
Ar is selected from the group consisting of:

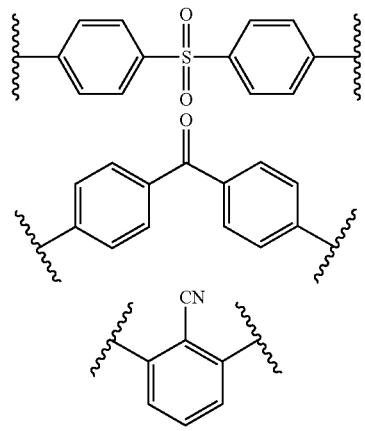

X is a halogen.

7. The polymer as claimed in claim 1 which has the structure of formula (IV):

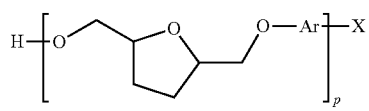

in which
p is an integer greater than 1
Ar is selected from the group consisting of:

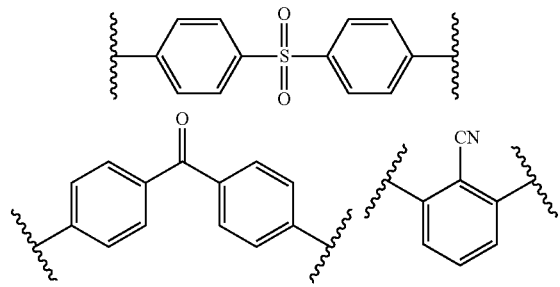

X is a halogen.

8. The polymer as claimed in claim 1 which has the structure of formula (V):

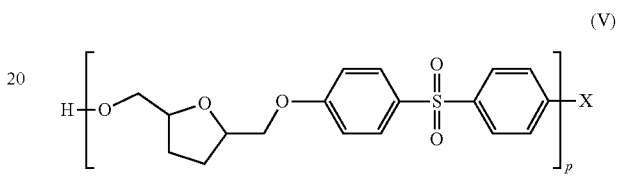

in which
p is an integer greater than 1
X is a halogen.

9. A membrane comprising the aromatic polyether as claimed in claim 1.

10. A process for preparing a polymer comprising the repeating unit(s) of formula (I):

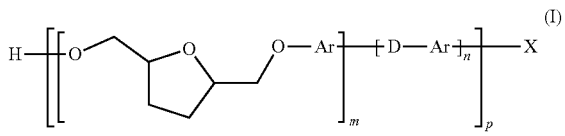

in which
m is an integer greater than 1
n is 0 or an integer greater than 1
the ratio m/n is between 100/0 and 1/99
p is an integer greater than 1
Ar is selected from the group consisting of:

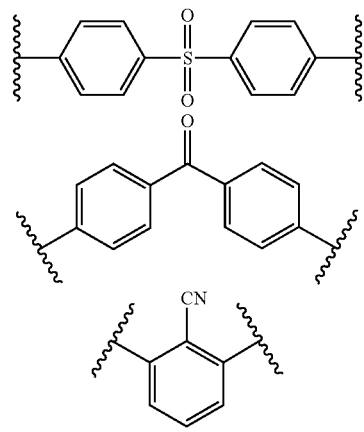

D is selected from the group consisting of:

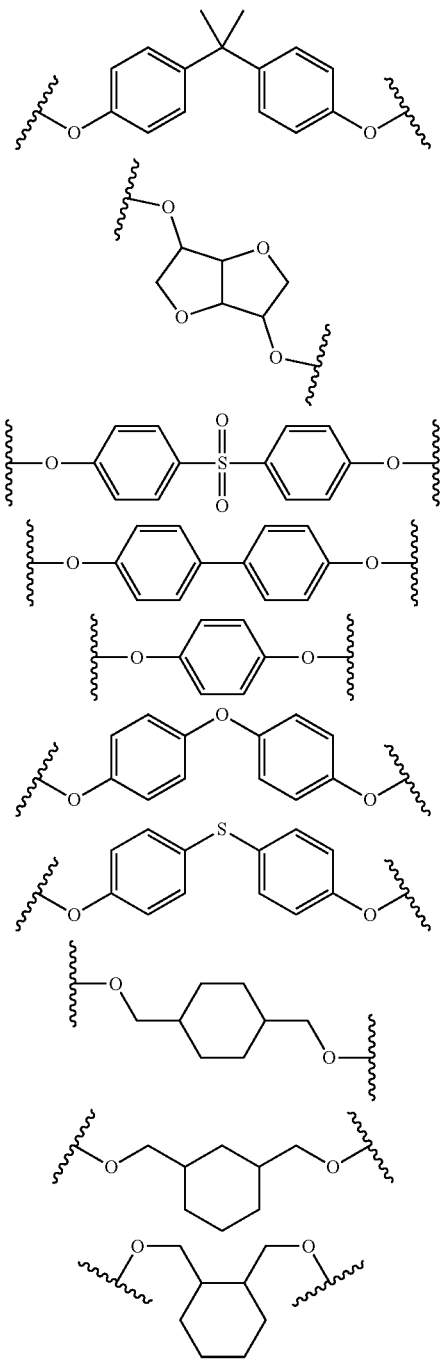

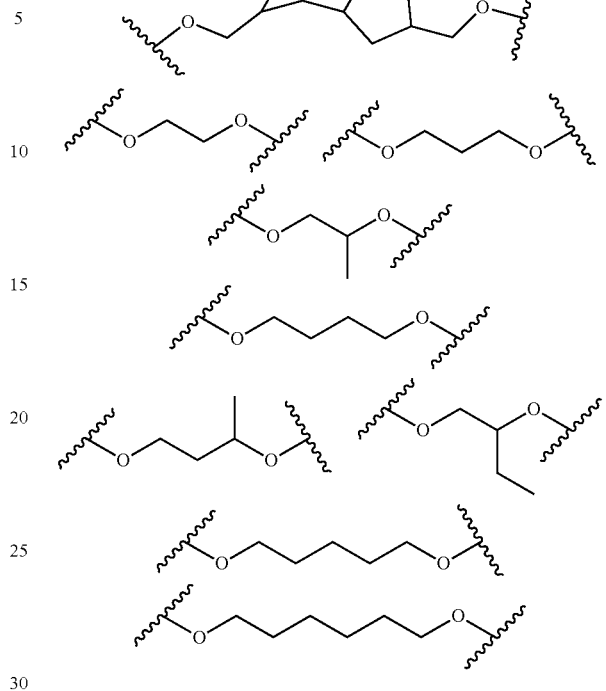

X is a halogen,
and comprises a step of reacting tetrahydrofurandimethanol, optionally in the presence of a co-diol of formula HO-D-OH, with a dihalo aromatic compound of formula X—Ar—X, in the presence of a base in an organic solvent.

11. The process as claimed in claim 10, wherein the mole ratio of tetrahydrofurandimethanol/co-diol is between 100/0 and 1/99.

12. The process as claimed in claim 10, wherein the base is chosen from alkali metal salts.

13. The process as claimed in claim 10, wherein the organic solvent is chosen from polar aprotic solvents.

14. The process as claimed in claim 10, wherein the proportion of monomers is between 10% and 50% by mass relative to the sum of the mass of solvent and of the mass of monomers.

15. The process as claimed in claim 9, wherein the reaction between the tetrahydrofurandimethanol, optionally in the presence of a co-diol, with a dihalo aromatic compound is performed at a temperature of between 160° ° C. and 240° C.

* * * * *